Figure 1:
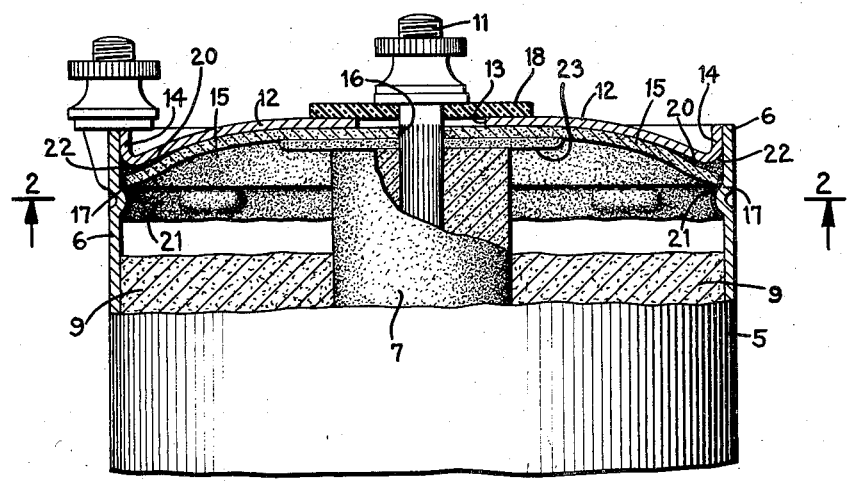

Dec. 24, 1935.    C. T. FLECKENSTEIN ET AL    2,025,028
DRY CELL
Filed July 21, 1933

INVENTORS
CLEMENS T. FLECKENSTEIN
THOMAS H. BYRNE
BY Frederick Griswold Jr.
ATTORNEY Patented Dec. 24, 1935

2,025,028

UNITED STATES PATENT OFFICE 2,025,028

DRY CELL

Clemens T. Fleckenstein and Thomas H. Byrne, Lancaster, Ohio, assignors to Bond Electric Corporation, Jersey City, N. J., a corporation of Delaware Application July 21, 1933, Serial No. 681,418

7 Claims. (Cl. 136—133)

This invention relates to so-called dry cells of the kind in which the open end of the cup-like zinc container is closed by a metal cover, although not so limited. More particularly, it relates to what are commonly known as No. 6 or 6" inch dry cells, such as are used for enunciator circuits, telephone circuits and the like.

Dry cells of this general type usually have a metallic terminal or binding post carried with a central carbon electrode, and the carbon electrode is insulated from the metallic cover by means of washers of dielectric material, usually fibre, through which the binding post passes. Difficulty has been experienced in sealing such cell closures against leakage of electrolyte from and admission of air to the cell, due to the fact, among others, that the washers are not always tightly clamped to the metallic closure and to the electrode, in manufacture.

One object of the present invention is to more effectively seal the cell and prevent the leakage of electrolyte therefrom. Accordingly, there is disposed immediately beneath the metal closure, a washer of substantially the same diameter as that of the interior diameter of the closure and which is preferably impregnated with an asphaltic compound or other substance of a tacky nature capable of absorption by the washer.

Another object of the invention is to provide sealing means for a metal top cell which is rendered particularly effective where the metal cover is soldered to the cup-shaped container or otherwise secured thereto by a process involving heat. That portion of the washer impregnated with the asphaltic compound, being closely adjacent the metallic joint to be soldered or otherwise heat treated, is heated during the joining operation so that the impregnating material softens and flows over the adjacent walls of the metal cover and container and subsequently hardens to cling tightly thereto and form a tight seal to which the washer adheres. The molten asphaltic compound flows in such a manner as to make a circular seal around the closure and the edge of the container.

It is also an object of the invention to more effectively seal the joint between the metal closure and the central carbon electrode than has heretofore been proposed. To this end, a layer of asphaltic compound, or the equivalent, is applied to the lower surface of the washer over an area somewhat larger than the diameter of the central electrode. The washer is thus separated from the carbon electrode by the layer of asphaltic compound which has an inherent tendency to flow all about and cling to the end of the carbon electrode as well as to the washer and form a liquid and air tight seal at that point.

The seal between the impregnated washer and the carbon electrode may be further improved in some situations by applying heat at the center after the metal closure is in position thereby causing the tacky material to flow and to more intimately bond with both the carbon electrode and the washer and, where present, the metallic terminal, which, when the asphaltic compound hardens, forms an effective air tight seal.

Figure 2:
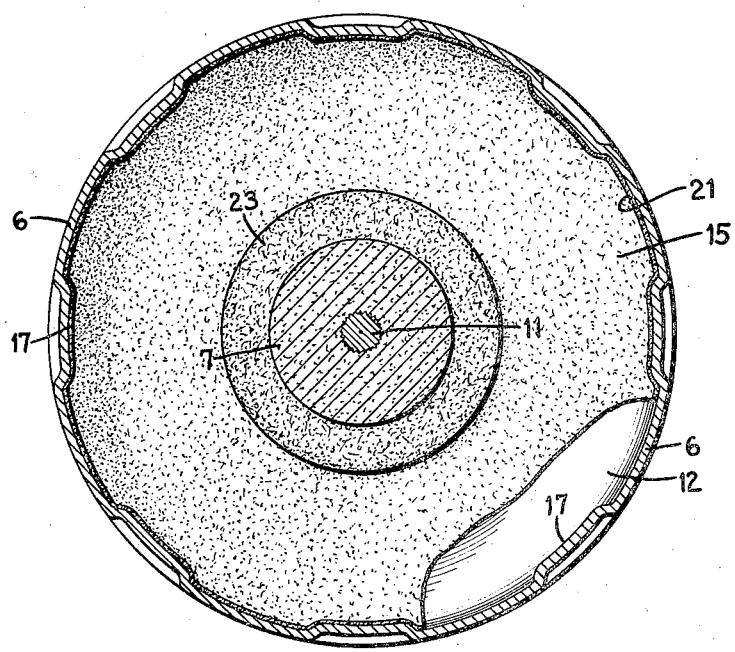

These and other objects of the invention and the means for their attainment will be more apparent from the following detailed description, taken in connection with the accompanying drawing illustrating one embodiment by which the invention may be realized, and in which:

Figure 1 is a fragmentary view, in transverse section and partly in elevation, showing the upper portion of a cell embodying the invention; and Figure 2 is a transverse sectional view taken in the transverse plane indicated by the line 2—2 of Figure 1, and looking in the direction of the arrows.

The invention is shown as applied to the so-called No. 6 or 6" dry cells of the type commonly employed in enunciator circuits, telephone circuits and the like, but is applicable, in its several aspects, to any cell. The metallic cup 5 is conveniently of zinc and contains, centrally disposed therein, a rod-like carbon electrode 7, the space between the walls of the cup and electrode being filled, as is usual, with any desirable electrolytic compound 9. The walls 6 of the cell are preferably cylindrical in shape and extend to a plane slightly above the top end of the central carbon electrode 7. In the illustrated embodiment, a metallic binding post 11 is shown as protruding from the upper end of the carbon electrode 7. Obviously, the invention is not restricted to the form of conductive terminal member by which electrical connection is made with the carbon electrode. The cell is closed by a metal cover 12 (of inverted dish shape for convenience) formed on its periphery with an upwardly directed cylindrical flange 14. The closure is formed with a central aperture 13 of a diameter greater than the diameter of the terminal 11 so as to be spaced at all times therefrom. The flange 14 nests within the rim 6 of the cup 5.

Immediately beneath the metal closure 12 is a sheet or disc 15 of non-metallic or dielectric material which, in the illustrated embodiment, has some degree, at least, of pliability and is of a diameter such as to lie adjacent and immediately beneath the metallic cover 12 and contact at its periphery with the rim of the cup. It is preferably slightly oversize so that its periphery is distorted to lie against and overlap the rim 6. It may be of any non-metallic or fibrous material such as a paper, felt or the like, so long as it is absorptive to an impregnating material and is dielectric. The disc 15 is impregnated with some material, which will soften and flow somewhat upon the application of heat, and which impregnating material renders the disc somewhat pliable and will harden and cling to the electrode surfaces but will not become brittle. Such material may be an asphaltic compound. The disc 15 is provided with a central aperture 16 through which the terminal 11 passes and which it may, if desired, fit substantially tightly.

At spaced points about the rim of the cup 6, elongated indentations are conveniently formed serving as shoulders 17 upon which the disc 15 and top 12 rest during assembly. Obviously, a continuous groove may be rolled into the cup for the same purpose.

To clamp the impregnated disc 15 between the metal cover 12 and the carbon electrode 7, if desired, there is provided a fibre washer 18 also having a central aperture of a diameter to receive the terminal post 11 and overlapping the larger central aperture 13 in the metal cover 12, which central aperture 13 is of a diameter sufficient to at all times be out of contact with the terminal member.

The flange 14 is adapted to be secured to the container rim 6 by solder. During the soldering operation, the heat melts the pitch or other impregnating material of the disc 15, causing it to flow in such manner as to make an annular seal around the under side of the top as indicated at 20 and on the side wall of the rim 6, as indicated at 21, and enters the joint 22 so as to form an effective seal at that point, which seal, as it hardens, clings tightly to the metal parts 6 and 14 and adheres to the disc 15, thus forming a tight and effective seal preventing the admission of air to the cell at this point and the escape of electrolyte therefrom.

A seal may also be obtained at the center of the closure. As shown, for an area slightly larger in diameter than the area of the top of the carbon electrode 7, the under surface of the impregnated disc 15 may, if desired, have applied thereto a layer 23 of a congealable substance, of material thickness, which is readily distortable and which will adhere to both the carbon electrode and the disc 15 or other washer thereabove. Thus, by the application of pressure and/or, if desired, heat, the layer of sealing material 23 or the impregnating material, as the case may be, bonds itself to the carbon rod electrode 7 and to the washer 15 and also to the terminal member 11 and, upon cooling and hardening, forms an effective air tight and fluid tight seal at this point also. The material 23 may also be an asphaltic compound.

The invention is obviously not limited to the use of solder at the joint between the metal cover and the cup since, obviously, the impregnating material of the washer may be caused to melt and flow by the application, proximate its periphery, of heat, irrespective of the method of joining the two metal parts. Similarly, while an asphaltum compound is referred to as the preferred impregnating material and sealing material, it will be obvious that any material is equally applicable which is capable of being softened by the application of heat and which will flow and adhere to the part of the cell and have a sufficiently tacky consistency to cling to the parts when cooled.

In using this type of seal in connection with dry cells, it is possible to use a different type of metal in the top, for instance, iron or tin plate in place of zinc to reduce the cost, because the edge seal obtained from the asphalt impregnated washer completely seals the inside of the cell from any contact with the foreign metal and prevents any tendency to develop an internal discharge.

Various modifications will occur to those skilled in the art in the composition, configuration and disposition of the component elements going to make up the invention as a whole as well as in the omission of or a substitution for one or more of the elements or ingredients illustrated or described, and no limitation is intended by the phraseology of the foregoing description or illustrations in the accompanying drawing.

What is claimed is:—

1. A dry cell comprising a metallic cup-shaped container, a carbon electrode therewithin and an electrolytic mass between the electrode and the container, a metallic cover closing the upper end of the container, a terminal extending therethrough, a disc of absorbent material impregnated with a material which is softened by the application of heat and which will harden but not become brittle and which is disposed between the top of the electrode and the under surface of the metal cover and contacting at its periphery with the walls of the container, and means to retain the metal cover against the electrode, the impregnating material of the disc adhering to the material of the cover and cup at the joint as a seal.

2. The method of sealing a dry cell comprising a metallic cup-shaped container, a carbon electrode therewithin, an electrolytic mass between the electrode and the container, a metallic cover closing the upper end of the container and a washer of absorbent material impregnated with a material which is softened by the application of heat and which hardens upon cooling without becoming brittle disposed between the top of the electrode and the under surface of the metal cover and contacting at its periphery with the walls of the container, comprising soldering the rim of the cover to the edge of the container thereby melting the impregnating material and causing it to adhere to the metal parts adjacent the joint.

3. The method of sealing a dry cell comprising a metallic cup-shaped container, a carbon electrode therewithin, an electrolytic mass between the electrode and the container, a metallic cover closing the upper end of the container and a washer of absorbent material impregnated with a material which is softened by the application of heat and hardened upon cooling without becoming brittle disposed between the top of the electrode and the under surface of the metal cover and contacting at its periphery with the walls of the container, applying heat to the cover at the rim thereof thereby melting the impregnating material and causing it to adhere to the metal parts adjacent the joint.

4. The method of sealing a dry cell comprising a metallic cup-shaped container, a carbon electrode therewithin, an electrolytic mass between the electrode and the container, a metallic cover closing the upper end of the container, a washer of absorbent material impregnated with a material which is softened by the application of heat and hardened upon cooling without becoming brittle disposed between the top of the electrode and the under surface of the metal cover and contacting at its periphery with the walls of the container, comprising applying heat to the cover adjacent the center thereby melting the impregnating material and causing it to adhere to the electrode and the cover.

5. The method of sealing a dry cell comprising a metallic cup-shaped container serving as one electrode of the cell, a carbon electrode therewithin and an electrolytic mass between the electrode and the container, a metallic cover closing the upper end of the container and a washer of absorbent material impregnated with a material which is softened by the application of heat and hardens upon cooling without becoming brittle disposed between the top of the electrode and the under surface of the metal cover and contacting at its periphery with the walls of the container, comprising applying heat to the cover thereby melting the impregnating material and causing it to adhere to the electrode and the cover.

6. The method of sealing a dry cell comprising a metallic cup-shaped container serving as one electrode of the cell, a carbon electrode therewithin and an electrolytic mass between the electrode and the container, a metallic cover closing the upper end of the container and a washer of absorbent material impregnated with an asphaltic compound disposed between the top of the electrode and the under surface of the metal cover and contacting at its periphery with the walls of the container, comprising applying heat to the cover adjacent the center to thereby melt the asphaltic compound and cause it to adhere to the electrode and the cover.

7. A dry cell comprising a metallic cup-shaped container, a carbon electrode therewithin and an electrolytic mass between the electrode and the container, a metallic cover closing the upper end of the container, a terminal extending therethrough and a disc of absorbent material impregnated with a material which is softened upon the application of heat and hardened upon cooling without becoming brittle disposed beneath the under surface of the metal cover and contacting at its periphery with the walls of the container.

CLEMENS T. FLECKENSTEIN.
THOMAS H. BYRNE.